Figure 1:
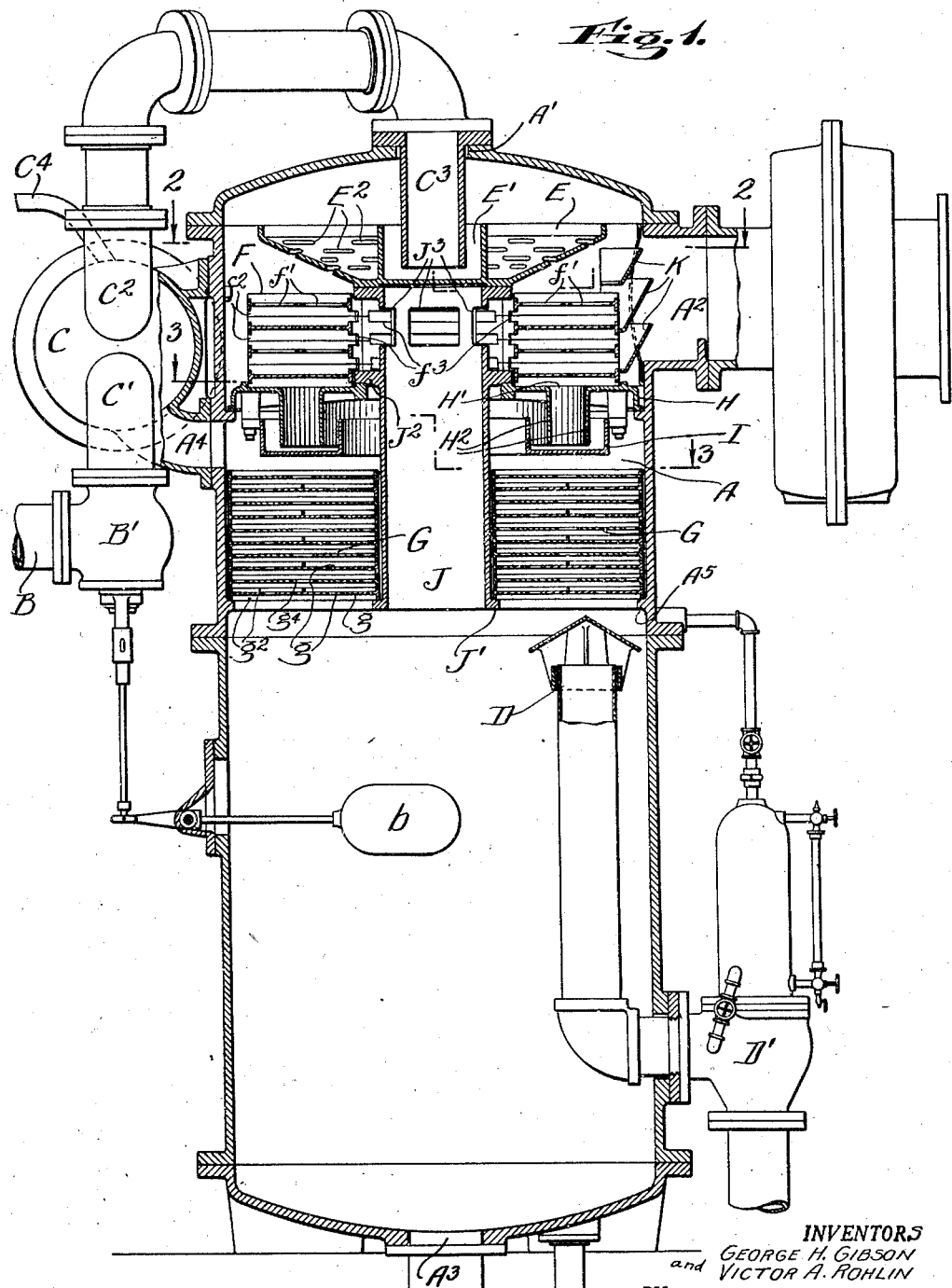

INVENTORS
GEORGE H. GIBSON
and VICTOR A. ROHLIN
BY John E. Hubbell
ATTORNEY

March 13, 1934.　　G. H. GIBSON ET AL　　1,951,015
WATER HEATING AND DEAERATION
Filed June 13, 1930　　3 Sheets-Sheet 2
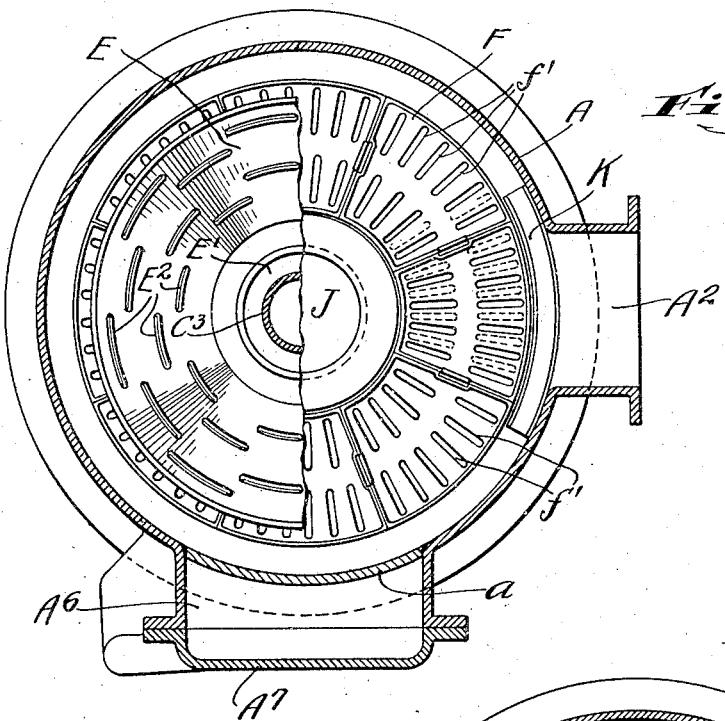
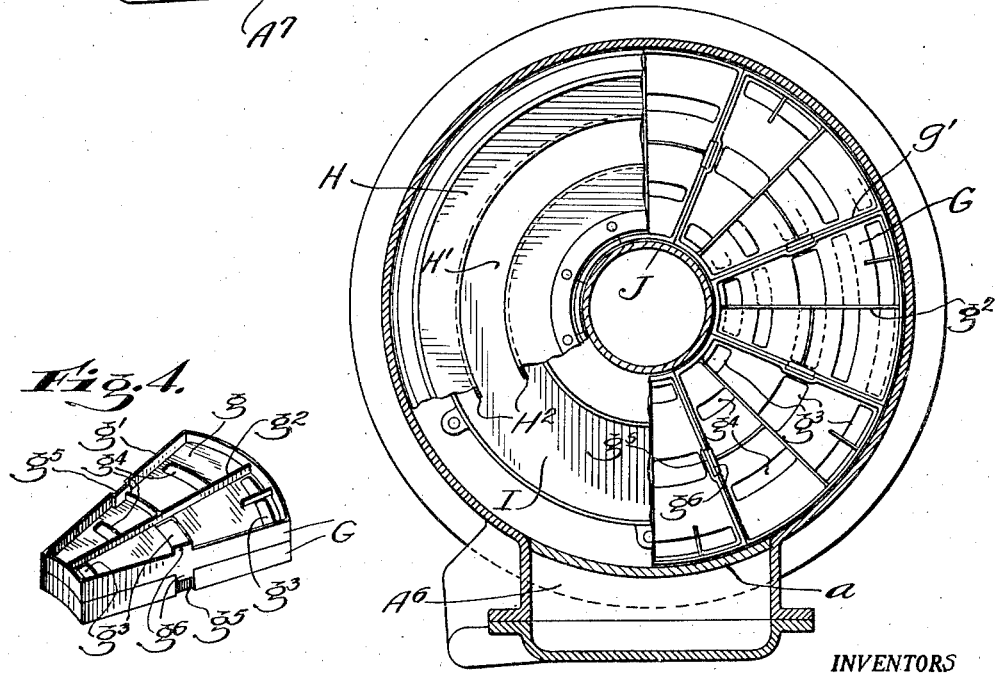
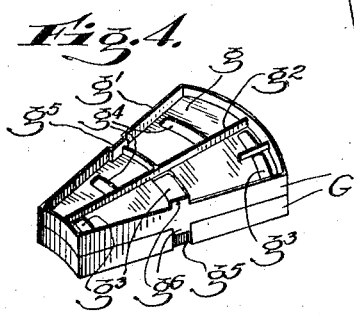
INVENTORS
GEORGE H. GIBSON
and VICTOR A. ROHLIN
BY John E. Hubbell
ATTORNEY March 13, 1934.  G. H. GIBSON ET AL  1,951,015
WATER HEATING AND DEAERATION
Filed June 13, 1930  3 Sheets-Sheet 3
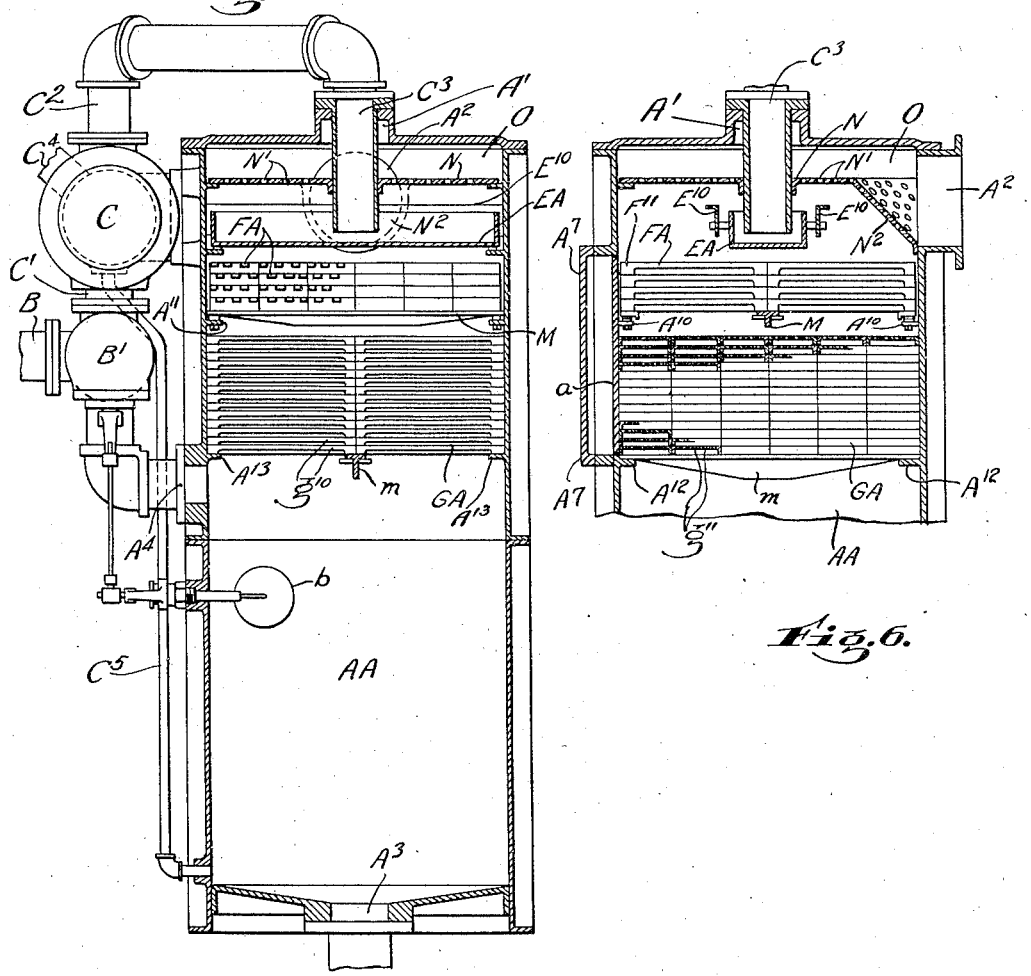
Fig. 5.
Fig. 6.
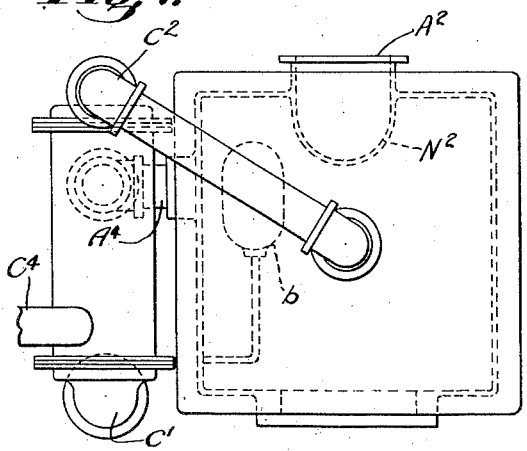
Fig. 7.
INVENTORS
GEORGE H. GIBSON
and VICTOR A. ROHLIN
BY John E. Hubbell
ATTORNEY Patented Mar. 13, 1934

1,951,015

UNITED STATES PATENT OFFICE 1,951,015

WATER HEATING AND DEAERATION

George H. Gibson, Upper Montclair, N. J., and Victor A. Rohlin, Philadelphia, Pa., assignors to Cochrane Corporation, Philadelphia, Pa., a corporation of Pennsylvania Application June 13, 1930, Serial No. 460,817

14 Claims. (Cl. 183—2.5)

The general object of the present invention is to provide an improved method of and apparatus for heating and deaerating or degasifying liquids. The invention was primarily devised, and is especially adapted for use in heating and deaerating boiler feed water, though water may advantageously be heated and deaerated by the use of the present invention for other than boiler feed purposes.

A more specific object of the present invention is to make it practically feasible to heat and deaerate a much larger quantity of water in apparatus of given weight, bulk and inherent cost of manufacture, than is practically possible with prior water heating and deaerating methods and apparatus now in, or adapted for commercial use.

The present invention follows the most usual practice of the prior art, in heating and deareating the water by bringing it into contact with steam, most of which is thereby condensed, and by venting from the deaerating space the uncondensed portion of the steam and the air and other gases liberated from the water in the heating and deaerating process. Moreover, some forms of apparatus embodying general principles of the present invention bear superficial resemblances to one of the best and most widely used types of water heating and deaerating apparatus now in commercial use; namely, the so-called two-stage, or induction-thoroughfare heater combination type.

In the last mentioned type of heating and deaerating apparatus, the water treated is passed successively through two zones or stages, in the first of which it is heated to, or nearly to its final temperature, by contact with steam which comes to that stage after having been utilized in the second stage in scrubbing the water passing through the second stage to free it from air or other gases not separated from the water in the first stage.

Such prior apparatus is sometimes referred to as of induction-thoroughfare heater combination type, because the first stage portion of the apparatus operates like an ordinary water heater of the induction type in that by virtue of the steam condensation occurring therein, it induces an inflow of steam in more or less proportion to the amount of water supplied; while the second stage portion of the apparatus operates like a water heater of the thoroughfare type in that the major portion of the steam supplied to it, is not condensed therein, but passes through this portion of the apparatus.

In practice, each heater of the induction-thoroughfare heater type of apparatus, is an open or contact water heater and the induction heater may be, and ordinarily is exactly like an ordinary open feed water heater. The thoroughfare heater of the combination, may also be exactly like an ordinary feed water heater, though it is now customary to employ therein an arrangement, differing from the ordinary open feed water arrangement, of the trays or baffles employed to retard the downflow of water through the heater and to increase the intimacy and thoroughness of contact of the water and steam.

While in the induction-thoroughfare combination type of apparatus, the bulk of the air separated from the water is ordinarily separated in the first stage, and some water heating may be done in the second stage, the first stage is commonly designated a heating stage because all, or nearly all, of the water heating effect is accomplished therein, and the second stage is commonly referred to as the deaerating stage because the primary purpose of the second stage is to augment the air separating action of the first stage.

Heretofore it has been assumed that the large volume of steam passing through the second or thoroughfare heater stage of the induction-thoroughfare heater combination type of apparatus is advantageous, because it insures a very low air tension in the air-steam mixture, the air liberated from the water in the thoroughfare heater stage being very small in amount relative to the amount of the steam with which it mixes. In the first, or induction heater stage, in which all of the air liberated in both stages is mixed with the steam, the air-steam mixture necessarily has a higher air tension. In consequence of the matters just referred to, the prior two-stage apparatus has been not inaptly described, as operating to maintain distinctly different characteristic atmospheres in the two stages.

We have discovered that in heating and deaerating water in two-stage apparatus, it is not practically essential to maintain distinctly different characteristic atmospheres in the first and second stages, and have discovered that the water heating and deaerating capacity of two-stage apparatus of given bulk and weight can be greatly increased by passing through the second or deaerating stage a comparatively small portion only, of the total amount of steam required for the heating and deaerating process. In preferred embodiments of the present invention, all of the steam used in the heating and deaerating process is passed directly into the first stage, and a relatively small portion of that steam not condensed in the first stage passes from that stage into the second stage, and is utilized therein in completing the deaeration of the water passing through that stage, and the vent mixture, consisting of the steam not condensed in either stage, and all air liberated in both stages, is discharged from the second stage, instead of from the first stage as is necessarily the case in the use of the prior induction-thoroughfare heater combination type of apparatus.

While in utilizing the present invention it may be desirable in some cases to vent a slightly greater relative amount of steam from the heating and deaerating apparatus than has heretofore been customary, the use of the present invention has demonstrated that if the amount of steam vented is relatively no larger than is customarily vented from the prior induction-thoroughfare heater type of apparatus, the air content in, and the air tension of the atmosphere in the deaerating section is not great enough to interfere with the practical efficiency of the deaerating process or the degree of deaeration obtained.

In practice, the increase in the heating and deaerating capacity of apparatus of given bulk and weight obtainable by the use of the present invention, is substantial. It amounts to 100 per cent. or more in some cases, and is mainly if not wholly due to the reduction in the amount of steam passing through the second or deaerating stage. The reduction in the amount of steam used in the second stage makes it possible to decrease the cross sectional areas of the steam flow passages of the second stage while at the same time the maximum velocity of steam flow is kept lower than has been customary heretofore. The decrease in cross sectional area of the steam passages increases the amount of tray surface which can be disposed in a given space volume, and contributes directly to a reduction in the bulk of the apparatus required for a given heating and deaerating load, and the decrease in steam velocity contributes indirectly to such reduction because it permits improved water distribution and a corresponding reduction in the amount of water spreading tray or baffle surface necessary to insure suitable intimacy and extent of water and steam contact.

Since with the present invention it is unnecessary to maintain distinctly different characteristic atmospheres in different portions of the apparatus, the steam as well as the water may pass downward through the inter-tray or baffle spaces of the deaerating section, and the parallel flow of the steam and water through this portion of the apparatus reduces to a practical minimum the disturbing effect of the steam flow on the water distribution, and hence contributes to increased capacity. A relatively low steam velocity permits of a uniformity of water distribution and a thinness of the streams of water, which is not possible of attainment with higher steam velocities, because with the higher steam velocities, the water flow is either retarded or speeded up by the steam, and in either event the action of the high velocity steam produces objectionable concentrations of water in some portions of the apparatus. Such concentrations, due to the retardation and thickening of the water streams of flowing films, produced by steam flow counter to the water flow, are especially prejudicial, unless the steam velocities are relatively quite low. When the steam flow through a tray stack is horizontal or crosswise to the general direction of water flow, the steam tends to sweep the water to one side of the apparatus, such action of the steam on the water streams falling from one baffle to another being especially objectionable.

The present invention may be carried out with the use of apparatus which is exactly like the apparatus heretofore used of the induction-thoroughfare heater combination type, in that it comprises definitely separated stages and provisions for preventing direct vapor flow between the lower end of the first stage and the upper end of the second stage, and which differs from such prior apparatus only in respect to the location of the points of steam supply and vent mixture discharge. The general principles of the present invention may be advantageously used, however, with apparatus of very different forms. In particular, they may be used with apparatus which does not comprise definitely or functionally separated stages.

In a preferred embodiment of the present invention, the apparatus employed consists, in its essentials, of a heating and deaerating chamber with a stack of baffles or trays interposed between an upper chamber space into which the water to be heated and the steam for heating and deaerating the water, are admitted, and a lower space which receives the heated and deaerated water and from which the vent mixture of uncondensed steam and liberated air is discharged.

In practice it is ordinarily desirable in apparatus of the form just described, to provide steam and water distributing means above the tray stack effective to insure a more or less uniform downflow into the stack at its upper end of the steam and water. In practice, also, it has been found desirable to employ a tray arrangement providing steam passages in the upper portion of the stack offering less resistance to steam flow, than do the steam passages in the lower portion of the stack where the volume of steam flow is appreciably smaller than in the upper portion of the stack due to the condensation of steam in the last mentioned portion.

With all forms of the present invention it is ordinarily desirable, also, to provide a vent condenser of some form to recover available heat in the vent mixture, and to reduce the load on the air pump or other exhauster necessarily employed to withdraw the vent mixture when the steam pressure in the deaerating chamber does not exceed the pressure of the atmosphere.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which we have illustrated and described a preferred embodiment of the invention.

Of the drawings:—
Fig. 1 is an elevation in section;
Fig. 2 is a section on the line 2—2 of Fig. 1, with parts broken away;
Fig. 3 is a section on the broken line 3—3 of Fig. 1;
Fig. 4 is a perspective view illustrating details of construction of some of the trays employed in Figs. 1, 2 and 3;
Fig. 5 is a sectional view taken similarly to Fig. 1, illustrating a modification;
Fig. 6 is a section taken at right angles to Fig. 5, of a portion of the apparatus shown in Fig. 5; and
Fig. 7 is a plan view of the apparatus shown in Figs. 5 and 6.

In the particular embodiment of the present invention illustrated in Figs. 1–4 the water treated is heated, and its deaeration is effected, in a chamber A within an enclosing tank or shell formed with a water inlet opening A' at its top, a steam inlet opening $A^2$ adjacent the top, a bottom outlet $A^3$ for the delivery of the heated and deaerated water, and a suitably located lateral outlet $A^4$ for the discharge of the vent mixture carrying the liberated air out of the chamber A.

The water entering through the inlet A' is discharged onto the upper end of a stack of trays F through the inter-tray spaces of which the water passes downward to a water sealed water outlet opening H', in a diaphragm or partition H extending across the chamber A beneath the trays F. The water passing through the outlet H' is discharged onto a stack of trays G, and after passing through the inter-tray spaces or passages of the bank or stack of trays G, the water falls into the water receiving space formed by the lower portion of the chamber A.

The steam supplied through the inlet $A^2$ fills the space above, and surrounding the stack of trays F, and the inter-tray spaces of said stack, and such portion of the steam as is not condensed in heating the water passing downward over the trays F, passes from the inter-tray spaces of the stack of trays F into a conduit J. The latter forms a by-pass for steam flow about the water seal outlet H'. As shown, the conduit member J opens at its lower end below the level of the stack of trays G, and the steam discharged by the conduit J beneath the stack of trays G passes upward through the inter-tray spaces of said stack to the vent outlet $A^4$ which leads from the chamber A between the partition H and the top of the stack of trays G.

The features of the apparatus shown in Figs. 1–4 which have already been described, are operative to efficiently heat and deaerate water at a greater rate than water can be similarly heated and deaerated in apparatus of similar bulk of any form heretofore known and adapted for commercial use.

For the most effective use of apparatus of the form shown in Figs. 1–4, it is necessary to arrange the trays F and G, and associated water and steam distributing provisions in such manner as to insure an intimacy and extent of steam and water contact effective to heat the water passing over the trays F to, or practically to, the temperature at which the steam enters the chamber A, and for so exposing the water passing down over the trays G to contact with steam as to reduce the air content of the water to as small an amount as many be necessary or practically desirable. For boiler feed purposes the air content of the water may thus be reduced to an amount less than that determinable by the well known Winkler test, which means in practice that the oxygen content of the water shall not exceed .01 cubic centimeters of oxygen per liter of water, as determined by the Winkler test.

In practice, also, the above described features of the apparatus shown in Figs. 1–4 ordinarily will have associated with them the usual adjuncts for regulating the supply of water to the chamber A, for preventing an undue accumulation of water in that chamber, and for recovering available heat in the vent mixture discharged through the outlet $A^4$, and for reducing the load on the air pump or other exhausting means necessary to draw out the vent mixture when the pressure in the chamber A does not exceed that of the atmosphere. Those skilled in the art will understand, however, that the above mentioned adjuncts and details of tray arrangement and steam and water distributing provisions are not of the essence of the present invention.

In the particular construction illustrated in Figs. 1–4, water is supplied to the chamber A through the inlet A' in accordance with the demand for treated water, from a supply pipe B through a valve B' opened and closed by a float b accordingly as the water level in the lower portion of the chamber A falls below or rises above a normal water level. As shown, the water passes from the valve B' to the inlet C' of a vent condenser C, which may well be a surface condenser, the condensing space of which receives the vent mixture leaving the chamber A through the outlet $A^4$. From the water space of the vent condenser C the water entering through the inlet C' passes out through the outlet pipe $C^2$. The latter is formed with a depending discharge end portion $C^3$ which extends downward into the chamber A through the inlet opening A'. Air mixed with vapor not condensed in the vent condenser C, is discharged from the condensing space of the latter through a condenser outlet $C^4$ to which an air pump or exhauster (not shown) may be connected when necessary or desirable.

In the form shown the chamber A is circular in horizontal cross section, though it might be square or of other shape. In consequence of the circular form of the chamber A, and the central disposition therein of the conduit J the stacks of trays G and F which surround the conduit J are of annular form. Advantageously each tray G, as is shown best in Fig. 4, is of sector shape and comprises a ported plate-like body g which is horizontally disposed, and a vertical flange or rim portion g', the body portions g of the superposed trays G being spaced apart by their abutting rim portions g'. As shown, each tray G is formed with stiffening ribs including a pair of central radially extending ribs $g^2$ at opposite sides of the tray body. Each tray body g is formed with a set of ports $g^3$ at one side of its ribs $g^2$ and another set of ports $g^4$ at the opposite sides of those ribs. The ports $g^3$ and $g^4$ are staggered with respect to one another in a radial direction, and in the assembled tray stack the ports $g^3$ of each upper tray body are located above the portion of the subjacent tray body g in which the ports $g^4$ of the latter are formed. In consequence the ports $g^3$ and $g^4$ of each pair of directly superposed trays g are not in register.

To facilitate the assemblage of the trays G in the stack, with the desired relative disposition of the ports in the superposed trays, each tray G is formed at one side with a recess $g^5$ and is formed at its opposite sides with projections $g^6$ from its rim portion g'. In the assembled tray stack the opposite ends of the recess $g^5$ in each intermediate tray receive the projections $g^6$ of the trays G immediately above and immediately beneath it.

The lowermost trays G are supported at their outer ends by an internal flange $A^5$ of the shell or tank structure enclosing the chamber A, and are supported at their inner ends on a circumferential flange portion J' of the member J. The latter is provided with an external flange $J^2$ which rests upon the member H at the margin of the central aperture in the latter through which the member J extends, the latter being thus supported by the member H.

The trays F are also shown as of sector shape and are generally similar in construction to, though somewhat different in form from the trays G. As shown, the ports $f'$ in the plate-like body portions of the trays F are in the form of radial slots, and the trays F are so assembled that the ports $f'$ in each intermediate tray are out of register with the corresponding ports in the trays F immediately below and above. As shown, the outer ends of the trays F are spaced away from the adjacent wall of the chamber A, thus providing an annular steam space surrounding the stack of trays F. Notches in the rim portions of the trays F form ports $f^2$ through which steam passes from said annular steam space into the spaces between the tray bodies of the trays F. As shown, also, the inner ends of the trays F are spaced away from the member J to provide an annular steam space within the tray stack. This annular steam space communicates with the interior of the conduit J through lateral ports $J^3$ formed in the latter, and is in communication with the spaces between the tray bodies of the trays F through ports $f^3$ formed by notches in the marginal flanges of the trays F.

To better distribute the flow of the steam into the stack of trays F and to prevent the steam entering through the inlet $A^2$ from impinging directly against the tray stack, steam deflecting baffles K are mounted in front of the inlet opening $A^2$. The upper end of the conduit J is closed by the imperforate central portion of a water distributing member E which is supported on the member J.

The lower end $C^3$ of the water delivery pipe extends down into a water seal chamber $E'$ formed in the member E. As shown, the member E is in the form of a conical dish with a circular flange portion enclosing the water seal chamber $E'$ and over which the water overflows into the portion of the member E surrounding the chamber $E'$. Thence the water flows in distributed streams through ports $E^2$ onto the top of the stack of trays F.

As is usual in water heaters, the tank or shell enclosing the chamber A is provided with a doorway $A^6$ surrounded by a marginal flange against which is normally seated a door $A^7$ which closes the doorway. Such a door and doorway facilitate the insertion, removal, and cleaning of the trays.

To prevent steam from passing around the outer edge of the stack of trays G and around the outer edge of the partition H through the flanged doorway space, the inner end of the latter may advantageously be closed, as shown by an inner door or plate $a$, the inner side of which forms a continuation of the cylindrical inner wall of the chamber A.

As shown the member H is formed with depending flanges $H^2$ at the margin of the outlet $H'$ which dip down into an annular trough member I uniting with said flanges to form a water seal preventing vapor flow through the outlet $H'$. The trough I serves as a water distribution box over the side edges of which the water passing through the trough overflows onto the top of the stack of trays G.

An overflow outlet connection D limits the maximum height of water level in the water storage space formed by the lower end of the chamber A. As such an overflow device, and the discharge valve or trap $D'$ to which it is connected are well known adjuncts of open water heaters and constitute no portion of the novel subject matter of this application, further reference to the parts D and $D'$ is unnecessary.

The operation of the apparatus shown in Figs. 1–4 has already been adequately described. Structurally that apparatus is not different in principle from two-stage deaerating apparatus heretofore known, except in respect to the location of the steam inlet $A^2$ and vent $A^4$ relative to the other portions of the apparatus. Operatively, the apparatus of Figs. 1–4 differs fundamentally from prior known two-stage apparatus. Insofar as the flow through the two stages are concerned, the steam and water flows are parallel and not counter to one another. In consequence of the direct admission of all the steam supplied to the first or heating stage and the use in the second or deaerating stage of only that relatively small portion of the total steam supplied which is not condensed in the heating stage, the volume of the steam used in the deaerating stage is relatively much smaller than the volume of steam used in the deaerating stage of prior two-stage heating and deaerating apparatus. The advantages of this reduction in the volume of steam used in the deaerating stage have already been described.

As has already been pointed out, the general principles of the present invention may be utilized in apparatus differing greatly in form from that disclosed in Figs. 1–4 inclusive, and Figs. 5, 6 and 7 illustrate another form of apparatus which I regard as practically superior to that shown in Figs. 1–4 for most, if not for all purposes.

In the construction shown in Figs. 5, 6 and 7, the tank wall enclosing the heating and deaerating chamber AA is formed with upper water and steam inlets $A'$ and $A^2$, a bottom water outlet $A^3$, and an intermediate vent or outlet $A^4$, as in the construction first described. Moreover, the vent outlet $A^4$ may lead to a vent condenser C through which water is passed to the outlet $A'$ as required, by means of associated parts B, $B'$, $b$, $C'$, $C^2$ and $C^3$ as in the construction first described.

The apparatus enclosed within the chamber AA consists essentially of a stack of water spreading trays or baffles FA and GA located below the steam and water inlets $A'$ and $A^2$ and above the vent $A^4$, and suitable provisions for causing a distributed entrance of the steam and water into said stack at its upper end. Those distributing provisions coupled with the steam and water ports and passages of the tray stack serve to cause a generally parallel flow of water and steam downward through the tray stack.

Major advantages of the present invention would be obtained with apparatus of the general form shown in Figs. 5, 6 and 7, even though the tray stack structure were uniform from top to bottom of the tray stack. Advantageously, however, the upper and lower trays FA and GA, respectively, differ in form and disposition, to the end of providing ports and flow channels offering less resistance to steam flow through the space including the trays FA, than in the subjacent space in which the trays GA are stacked.

As shown, each tray FA comprises a trough shaped body and end head positions $F^{11}$, the portions $F^{11}$ of the different trays cooperating with one another to space the trays apart. In the particular form illustrated, the length of each tray FA is equal to half the width of the tank chamber, and the trays FA are arranged in two rows, the trays in each row being in end to end relation with the trays of the other row. The stack of trays FA is supported by internal flange portions $A^{10}$ of the tank structure, and by a central beam M resting at its ends on internal flange portions A¹¹ of the tank structure. The beam M and flange portions A¹⁰ extend transversely to the length of the trays FA.

The lower trays or baffles GA are shown in the form of shallow inverted troughs, each comprising an elongated ported plate-like body and depending side flanges $g^{10}$. Advantageously, the ports $g^{11}$ in the tray bodies are in the form of relatively narrow slots extending longitudinally of the trays. The trays are arranged in superimposed tiers or layers, each of which comprises six rows of trays. The lower tier trays GA are shown as supported at their inner ends by a central beam $m$ carried by internal tank lugs or projections A¹², and at their outer ends by internal flange portions A¹³ of the tank shell extending parallel to the beams $m$ at the opposite sides of the chamber AA. Preferably, the trays GA are so arranged that the ports $g^{11}$ in the trays at any one level are staggered or horizontally displaced with respect to the ports in the trays below and above.

The water supplied through the vent condenser outlet pipe C³ is discharged by the latter into a water sealing and distribution trough EA which extends transversely to the length of the individual tray members FA. The water flows from the trough EA over the side edges of the latter onto the bank of trays FA at opposite sides of the tank center. As shown, baffles E¹⁰ carried by, but spaced away from the sides of the trough EA, prevent the water from splashing out horizontally into the spaces at the sides of the trough.

Advantageously, provisions are made for obtaining a steam downflow into the top of the tray stack which is distributed with suitable uniformity across the entire cross section of the chamber AA. For this purpose a perforated diaphragm N is extended across the upper portion of the chamber A at a level somewhat above that of the bank of trays FA, thereby providing a steam space O above the diaphragm N to which steam is initially supplied through the steam inlet A². With the latter opening through the side wall of the chamber A as shown, and as is frequently desirable in practice, the over-all height of the apparatus may be reduced by locating the major portion of the diaphragm member N above the bottom of the inlet opening A², and by forming the diaphragm with a depressed portion N² extending to the underside of the inlet A² as shown in the drawings.

While the details of tray construction and arrangement illustrated in Figs. 5, 6 and 7 are well adapted for their intended purposes, those skilled in the art will understand that those details are not of the essence of the present invention. While it is desirable to distribute the downflowing water and steam with approximate uniformity across the cross section of the chamber AA from top to bottom of the tray stack, and to suitably retard the water flow and thereby insure the proper extent and duration of steam and water contact, those results can be obtained with very different tray arrangements from those shown.

It is advantageous, however, to provide a space between the upper trays FA, in which the bulk of the condensation occurs, and the lower trays GA, in which little condensation occurs, because the descending steam has an opportunity to redistribute itself in said space, and hence may be more uniformly distributed through the steam space in the lower bank of trays. While good steam distribution is desirable in the upper tray bank as well as in the lower tray bank, it is of most importance in the last mentioned bank. Owing to the practical difficulties in insuring perfect distribution of water at the top of the upper trays and the effect on steam distribution of the greater condensation of steam in the portions of the upper bank in which the water may be concentrated, it is practically impossible to insure perfect steam distribution without undesirably complicating or adding to the expense of constructing the upper bank. Some non-uniformity in steam distribution in the upper tray bank is not seriously prejudicial. Uniformity of steam distribution in the lower tray bank is highly desirable, however, and the provision of the space shown in Figs. 5 and 6 between the two tray banks tends to good distribution in the lower tray bank even when the steam distribution in the upper bank is not so good.

As already indicated, however, there is some advantage in distributing the steam flow throughout the space above the tray stack so that the steam flows more or less directly downward into all the spaces between the uppermost trays FA, as such distribution of steam flow at the very top of the tray stack tends to avoid objectionable modification of the distribution of the downflowing water at any tray stack level.

As previously indicated, also, there is an advantage in making the tray stack more open in its upper portion than in its lower portion, as the increased cross sectional area of the steam passages in the upper portion of the stack in which the volume of steam is relatively large avoids an objectionable resistance to steam flow and tends to the avoidance of undesirable steam velocities and directions of steam flow, and also tends to the avoidance of water hammer which might otherwise result from the rapid condensation of steam occurring in the upper portion of the stack.

The condensation of steam occurring in the upper portion of the stack, where all or the major portion of the water heating action takes place, results, of course, in a reduced volume of steam flow through the lower portion of the stack. In consequence, the trays in the lower portion of the stack may advantageously be shaped and arranged to increase the area of water surface exposed to contact with the steam per unit of volume of space, since with the reduced steam volume, the trays may be spaced more closely, and the cross sections of the flow passages correspondingly reduced, without producing objectionably high steam velocities.

In practice, apparatus of the form shown in Figs. 5, 6 and 7 will ordinarily be designed so that in normal operation practically all, or at least the major portion of the water heating action will occur in the portion of the tray stack including the trays FA, the portion of the stack including the trays GA normally then serving entirely, or almost entirely, as a deaerating stage or section. It is not essential, however, that the trays FA should be used exclusively in the heating stage or zone, and the trays GA in the deaerating stage or zone. Indeed, there need be no definite plane of demarcation between the two stages in such apparatus, and, indeed, in ordinary practice such plane rises and falls in consequence of changes in ordinary operating conditions.

The fact that the steam and water flow are parallel to one another from top to bottom of the tray stack is advantageous, as already explained, because the parallel flow of the steam and water tends to less interference with water distribution than does counter or cross current flow. In practice it is desirable from the standpoint of apparatus compactness, to so proportion the tray stack parts that the actual velocity of steam flow is much higher than the water flow at all tray stack levels.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:—

1. In heating and deaerating water by first exposing the water to contact with steam in a heating stage in which the water is raised approximately to the temperature of the steam, and then in a deaerating stage in which the deaeration of water is completed without reduction in temperature, the improvement which consists in directly supplying to the heating zone steam in excess of the amount therein condensed in heating the water approximately to the temperature of the steam and utilizing the uncondensed residue of said steam as the scrubbing steam in the deaerating stage and in each stage insuring extensive intimate contact of the steam and water by causing the latter to pass downward in a multiplicity of streams of water in contact with a similar multiplicity of streams of steam across each of a plurality of horizontal planes.

2. The process of heating and deaerating water which consists in effecting contact of the water to be heated and deaerated with steam in excess of the amount required to heat the water to the temperature of the steam, and after the water is thereby heated approximately to the temperature of the steam maintaining the water in contact with the uncondensed residue of the steam to complete its deaeration, and in each stage insuring extensive intimate contact of the steam and water by causing the latter to pass downward in a multiplicity of streams of water in contact with a similar multiplicity of streams of steam across each of a plurality of horizontal planes and finally separating from the water a vapor mixture containing the uncondensed steam and the air liberated in the process.

3. The method of heating and deaerating water which consists in passing the water and steam but little in excess of that required for heating and deaerating the water in the same direction along a flow path comprising tortuous flow passages elongated in the direction of water flow sufficiently to heat the water approximately to the temperature of the steam in an initial portion of said path and sufficiently restricted to compel the steam and air liberated from the water to pass through said passages with a velocity substantially greater than that of the water.

4. The method of heating and deaerating water which consists in passing the water and steam for heating and deaerating the water in the same direction along a flow path comprising tortuous flow passages elongated in the direction of water flow sufficiently to heat the water approximately to the temperature of the steam in an initial portion of said path and less restricted in said initial portion than in the final portion whereby objectionably high steam velocities in said initial portion are avoided, while the steam and the air liberated from the water are caused to pass through said passages with a velocity at all points along the length of the flow path substantially greater than that of the water.

5. Water heating and deaerating apparatus comprising a chamber, water spreading and retarding devices located in said chamber between upper and lower levels and arranged to provide a multiplicity of tortuous restricted downflow passages distributed horizontally across said chamber and extending between upper and lower levels for the downflow of water and steam past said devices, means for introducing water to be heated and steam into said passages at said upper level, means for discharging heated water from the lower portion of said chamber, and means for discharging from said chamber the uncondensed steam passing downward through said passages and the air liberated from the water and mixed with said uncondensed steam.

6. Water heating and deaerating apparatus comprising a chamber, water spreading and retarding devices located in and distributed horizontally across said chamber, means for passing water to be heated and steam into the portion of said chamber above said devices, said devices being arranged to provide tortuous restricted downflow passages distributed horizontally across said chamber for water and steam flow downward through said chamber past said devices, a heated water outlet from said chamber, and means for discharging from said chamber the uncondensed steam passing downward through said passages and the air liberated from the water and mixed with said uncondensed steam.

7. Water heating and deaerating apparatus comprising in combination a deaerating chamber, means for supplying water to be treated and steam for heating and deaerating the water to the upper end of said chamber, and subjacent flow directing and distributing devices providing a multiplicity of steam and water downflow passages having their upper inlet ends distributed horizontally across the entire cross section of said chamber and having their subjacent portions distributed and disposed to compel a downflow of water and steam in said chamber distributed horizontally across the entire cross section of the chamber, and to break up the downflowing water into divided streams whereby intimate and extended steam and water contact is effected.

8. Water heating and deaerating apparatus comprising a chamber, a tray stack therein extending across the chamber between upper and lower levels and providing a multiplicity of down flow passages having their upper inlet ends distributed across the entire horizontal cross section of said chamber, and means for causing a down flow in said passages of water to be heated and deaerated and steam for heating and deaerating the water including means for supplying said water and steam to said chamber at an upper level and provisions for distributing the down flow of water so supplied horizontally across said chamber onto the tray stack at its upper end.

9. Water heating and deaerating apparatus comprising a chamber, a stack of baffle devices therein, means for passing the water to be treated onto said stack, means supplying steam for heating and deaerating water to the upper portion of said stack including provisions for causing a downflow of steam into the stack at points distributed over substantially the entire top of said stack, said devices being arranged to provide flow passages for steam less restricted in the upper portion of the stack than in the lower portion of the stack.

10. Water heating and deaerating apparatus comprising in combination a deaerating chamber, means for supplying water to be treated and steam for heating and deaerating the water to the upper end of said chamber, and flow directing and distributing devices cooperating to compell a downflow of water and steam distributed across the entire cross section of the chamber and to retard the downflowing of water and break it up into finely divided streams and to provide flow passages for the steam less restricted in the upper portion of said chamber than in the lower portion.

11. In heating and deaerating water by contact with steam first in a heating stage in which the major portion of the water heating action occurs and then in a deaerating stage in which the water deaerating action is completed and from which a portion of the steam supplied in admixture with the liberated air is withdrawn, the improvement which consists in moving the steam and water downward along a flow path which at each of a plurality of different levels comprises a multiplicity of passages of relatively small cross section through each of which steam and water pass in close contact with one another.

12. Water heating and deaerating apparatus comprising in combination a treating chamber, means for supplying water to be treated and steam for heating and deaerating the water to the upper end of said chamber and flow directing and distributing devices providing a multiplicity of narrow passages for the downflow of water and steam through said chamber distributed horizontally across the entire cross section of the chamber and effecting intimate and extended contact of the downflowing steam and water.

13. Water heating and deaerating apparatus comprising in combination a treating chamber, means for supplying water to be treated and steam for heating and deaerating the water to the upper end of said chamber, and water and steam distributing means comprising a horizontal water distributing trough extending across the chamber adjacent its upper end, and a stack of trough shaped trays serving as individual water distributing devices located below and extending transversely to said trough and receiving water therefrom, said stack of trays being formed to provide a plurality of relatively small orifices distributed across the cross section of the chamber at successive levels therein and collectively forming at each of said levels the only path of downflow for steam and water at said level.

14. Water heating and deaerating apparatus comprising a chamber, water spreading and retarding devices located in said chamber between upper and lower levels and divided into upper and lower groups separated by a steam distribution equalizing space, and each arranged to provide tortuous restricted flow passages distributed horizontally across said chamber between upper and lower levels for the downflow of water and steam past the said devices of the group, means for introducing water and steam into the said passages at the upper end of said upper group, and means for discharging from said chamber the uncondensed steam passing downward through the said passages of the lower group and the air liberated from the water and mixed with said uncondensed steam.

GEORGE H. GIBSON.
VICTOR A. ROHLIN.